(12) United States Patent
Doffin et al.

(10) Patent No.: US 9,738,166 B2
(45) Date of Patent: Aug. 22, 2017

(54) METHOD FOR THE CONTACTLESS CHARGING OF A BATTERY OF AN ELECTRIC MOTOR VEHICLE

(71) Applicant: RENAULT s.a.s., Boulogne-Billancourt (FR)

(72) Inventors: Hugues Doffin, Buc (FR); Samuel Cregut, Saint Remy les Chevreuse (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 304 days.

(21) Appl. No.: 14/386,632

(22) PCT Filed: Mar. 5, 2013

(86) PCT No.: PCT/FR2013/050471
§ 371 (c)(1),
(2) Date: Sep. 19, 2014

(87) PCT Pub. No.: WO2013/140059
PCT Pub. Date: Sep. 26, 2013

(65) Prior Publication Data
US 2015/0048788 A1    Feb. 19, 2015

(30) Foreign Application Priority Data
Mar. 19, 2012  (FR) ..................... 12 52456

(51) Int. Cl.
*H02J 7/00* (2006.01)
*H02M 5/00* (2006.01)
(Continued)

(52) U.S. Cl.
CPC ......... *B60L 11/182* (2013.01); *B60L 11/1811* (2013.01); *B60L 11/1812* (2013.01);
(Continued)

(58) Field of Classification Search
CPC . B60L 11/182; B60L 11/1838; B60L 11/1811; H02J 7/025
(Continued)

(56) References Cited

U.S. PATENT DOCUMENTS

| 4,654,573 | A |   | 3/1987 | Rough et al. |
| 4,808,948 | A | * | 2/1989 | Patel .................... B06B 1/0261 156/73.2 |

(Continued)

FOREIGN PATENT DOCUMENTS

WO    WO 2008/145982 A2    12/2008

OTHER PUBLICATIONS

International Search Report issued Apr. 23, 2013 in PCT/FR2013/050471.
(Continued)

*Primary Examiner* — M'Baye Diao
(74) *Attorney, Agent, or Firm* — Oblon, McClelland, Maier & Neustadt, L.L.P.

(57) ABSTRACT

A method for contactless charging of a battery of an electric motor vehicle by magnetic induction using a transmitter coil of a charging device and a receiver coil of the vehicle, the method including: controlling electrical power supply and instructions of an inverter at terminals of which the transmitter coil is connected, according to a variable frequency; measuring, in an analog circuit, at least one analog signal relative to a current or to a voltage at terminals of the transmitter coil; digitally processing at least two incoming digital signals by a control board, a first incoming signal being relative to the voltage and a second incoming signal being relative to the current; transmitting output signals from the control board to the inverter to lock the inverter to a value of a phase difference calculated between the current and the voltage.

12 Claims, 5 Drawing Sheets

(51) Int. Cl.
  *B60L 11/18* (2006.01)
  *H02J 7/02* (2016.01)
(52) U.S. Cl.
  CPC ....... *B60L 11/1831* (2013.01); *B60L 11/1838* (2013.01); *H02J 7/025* (2013.01); *B60L 2210/40* (2013.01); *Y02T 10/7005* (2013.01); *Y02T 10/7072* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)
(58) Field of Classification Search
  USPC .......................... 320/108, 109, 137; 363/164
  See application file for complete search history.

(56) References Cited

U.S. PATENT DOCUMENTS

| | | | | |
|---|---|---|---|---|
| 5,654,621 | A * | 8/1997 | Seelig | B60L 11/182 320/108 |
| 6,831,845 | B2 * | 12/2004 | Biebach | H02M 3/28 363/16 |
| 7,868,665 | B2 * | 1/2011 | Tumer | H03F 3/087 327/509 |
| 8,847,541 | B2 * | 9/2014 | Mizuguchi | H02P 21/06 318/400.02 |
| 9,173,344 | B2 * | 11/2015 | Bernini | A01D 34/008 |
| 2010/0172168 | A1 | 7/2010 | Fells | |
| 2011/0291606 | A1 | 12/2011 | Lee | |
| 2015/0091516 | A1 * | 4/2015 | Blum | B60L 11/1838 320/108 |

OTHER PUBLICATIONS

French Preliminary Search Report issued Jan. 17, 2013 in French Patent Application No. FR 1252456 (with English translation of categories of cited documents).

Chwei-Sen Wang, et al., "Design Considerations for a Contactless Electric Vehicle Battery Charger" IEEE Transactions on Industrial Electronics, vol. 52, No. 5, XP11139887A, Oct. 2005, pp. 1308-1314.

* cited by examiner

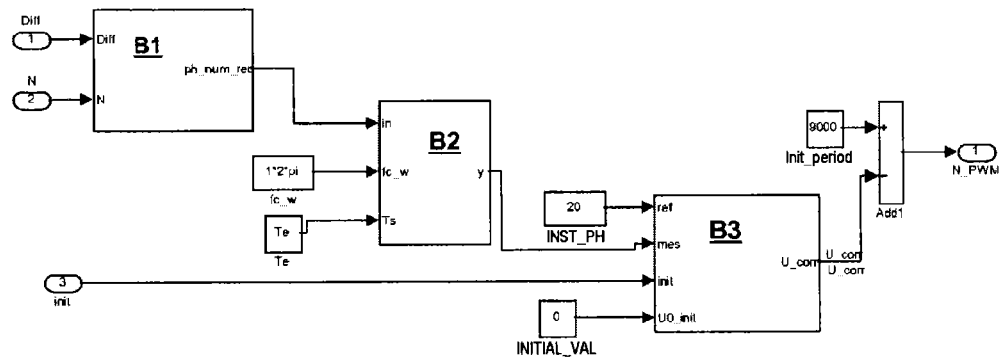
FIGURE 4
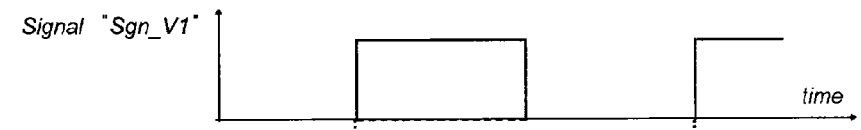
FIGURE 6a
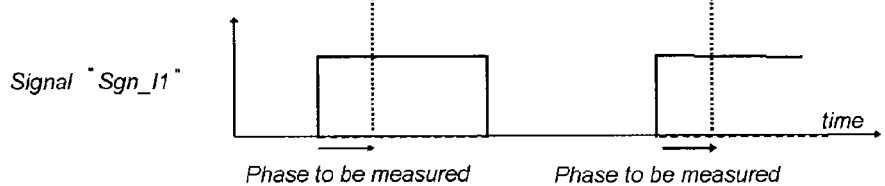
FIGURE 5a
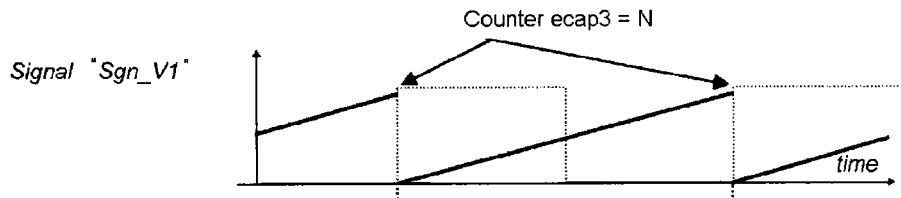
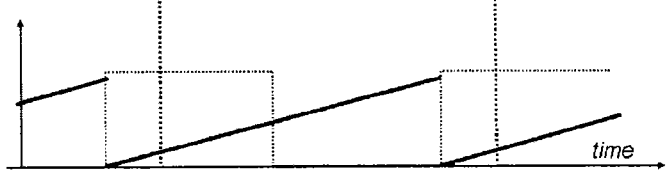
FIGURE 6b
FIGURE 5b
Software interrupt: Counter ecap4 = Diff; counter ecap3 = N

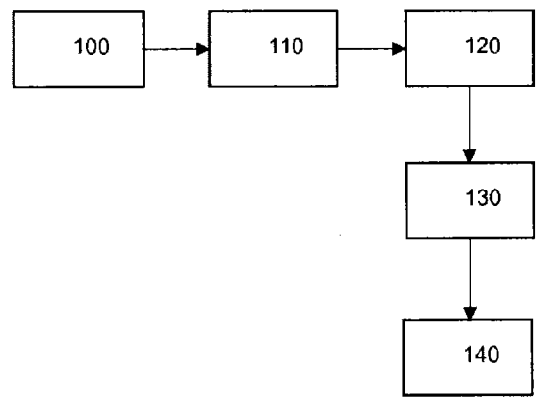
FIGURE 6
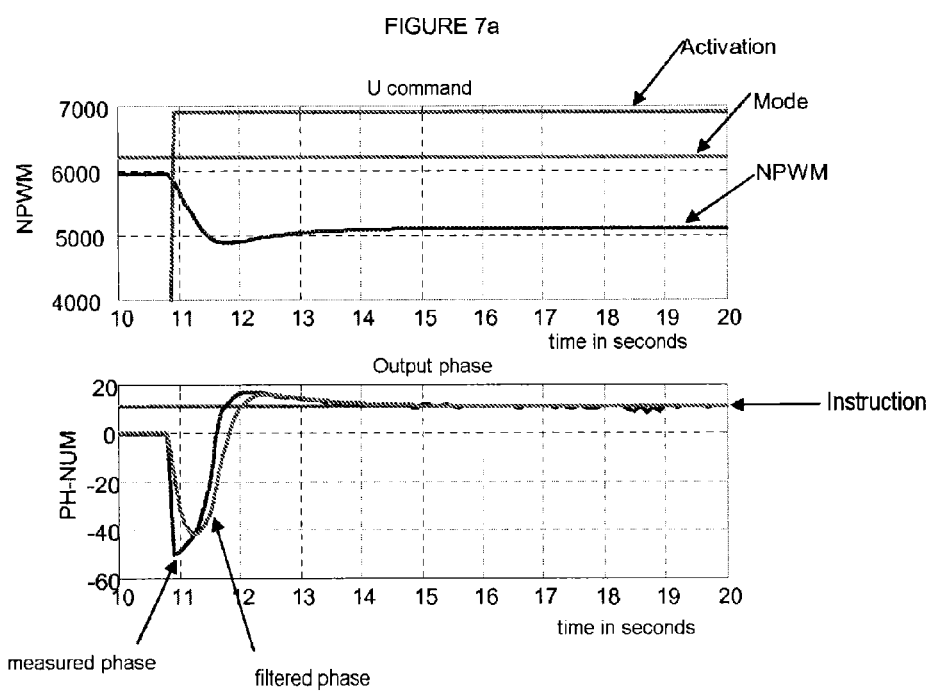
FIGURE 7a
FIGURE 7b

METHOD FOR THE CONTACTLESS CHARGING OF A BATTERY OF AN ELECTRIC MOTOR VEHICLE

This relates to the contactless charging of a battery of an electric or hybrid motor vehicle.

BACKGROUND

Field of the Invention

The charging is carried out by magnetic induction: in a location called the "charging area", a current is made to flow in a ground circuit having a transmitter coil, or primary, supplying power to a receiver coil, or secondary, in an electric or hybrid motor vehicle, hereinafter referred to simply as a "vehicle".

The magnetic induction phenomenon takes place only if the primary and secondary coils are sufficiently close to one another, and the transmitted power depends to some extent on the resonance of the ground circuit. Although the vehicle is stationary while being charged, the frequency of the current flowing in the circuit must be adapted according to the position of the secondary relative to the primary, and therefore according to the position of the vehicle in the charging area relative to the primary (stationary) coil. The purpose of this is to achieve resonance of the system.

Thus, more precisely, according to a first of its objects, the invention concerns a method of contactless charging of a battery of an electric motor vehicle by magnetic induction between a resonant transmitter circuit comprising a transmitter coil of a charging device and a resonant receiver circuit of the vehicle comprising a receiver coil, the vehicle being positioned above the transmitter coil so as to provide magnetic coupling between the transmitter coil and the receiver coil, the method comprising steps consisting of:

controlling the electrical power supply and the instructions of an inverter to the terminals of which the transmitter coil is connected according to a variable frequency, measuring in an analog circuit at least one analog signal relating to a current or to a voltage across the terminals of the transmitter coil.

Description of Related Art

A method of this kind is known to those skilled in the art, notably from the example provided by the prior art document EP2317624 which proposes, notably, to compare phases between the voltage and the current in order to control the excitation frequency, in a circuit having a "phase comparator" module, on the basis of logic signals which are images of the sign of the current and the voltage, in order to generate a signal whose variable amplitude causes a variation in the excitation frequency by means of a VCO (standing for the English "Voltage Controlled Oscillator") module, that is to say a voltage controlled oscillator which generates a signal whose frequency depends on the input voltage.

Other solutions consist in varying the frequency of the charging circuit as a function of the power received at the secondary; in this case, however, the vehicle battery may refuse an excessive power transfer.

However, these solutions are complicated and costly to implement.

BRIEF SUMMARY

The object of the present invention is to overcome these drawbacks by proposing a simple and essentially digital solution.

With this object in mind, the method according to the invention, which also conforms to the aforementioned preamble, is essentially characterized in that it further comprises steps consisting of:

digitally processing, by means of a control card, at least two incoming signals, namely a first incoming digital signal (Sgn_V1, PWM1-A) relating to the voltage (U) and a second incoming digital signal (Sgn_I1, PWM1-B) relating to the current (I), in order to calculate the phase difference between the current (I) and the voltage (U), transmitting digital output signals (PWM1-A, PWM1-B) from the control card to the inverter so as to lock the inverter to the calculated value of the phase difference between the current (I) and the voltage (U).

Owing to the invention, the detection of the phase difference between current and voltage is very simple in terms of hardware, and minimizes the number of electronic hardware components and consequently the cost of implementation, since the essential part of the operation is carried out digitally. Preferably, the value of the phase difference corresponds to the resonance of the system.

Because of these characteristics, the adjustment of performance in the digital part is simple and parameterizable. More precisely, the frequency locking is provided by means of a software loop, providing total flexibility in the adjustment of the locking. The frequency is fully variable according to requirements and is not subject to parameters defined by discrete components, which define permitted lower and upper frequency limits. As a result, the adaptation of the frequency is improved.

Owing to the invention, a search can be made for resonance at a very low power transfer level, which is useful because a vehicle battery may refuse an excessive power transfer.

Furthermore, the present invention requires only analog components and a control card.

Thus the present invention substantially reduces the number of analog components, replacing them with functions provided by the software processing executed by the control card.

In one embodiment, an additional step is provided, consisting in converting said at least one analog signal to at least one digital signal (Sgn_I1, Sgn_V1).

Because of this characteristic the overall dimensions of the present invention can be decreased, for example by eliminating a hardware means of measuring the phase difference between voltage and current. This reduces the number of hardware components.

In one embodiment, in the step in which said at least two incoming digital signals are digitally processed by means of a control card, provision is made for said at least two incoming digital signals to be formed by a digital signal (Sgn_V1) relating to the voltage and a digital signal (Sgn_I1) relating to the current, these two signals (Sgn_I1, Sgn_V1) resulting from the aforementioned conversion step.

This enables the phase difference between the current phase and the voltage phase to be minimized. Because of this characteristic, the system has a degree of robustness due to the use of a phase locked loop.

Owing to the invention, the frequency locking is implemented by a software loop, providing total flexibility in the adjustment of the locking (the frequency is fully variable according to requirements).

Advantageously, the locking is implemented by a proportional-integral controller in which the value of the proportional gain and/or the value of the integral gain are chosen so as to optimize the speed of convergence of the variable frequency to the predetermined value.

In one embodiment, in the step in which said at least two incoming digital signals are digitally processed by means of a control card, provision is made for said at least two incoming digital signals to be formed, according to choice, by:
- a digital signal (Sgn_I1) relating to the current and resulting from the conversion step as mentioned above, and an output digital signal (PWM1-A) relating to the voltage, or
- a digital signal (Sgn_V1) relating to the voltage and resulting from the conversion step as mentioned above, and an output digital signal (PWM1-B) relating to the current.

It is even more advantageous to couple either one of these output digital signals of the control card to the digital signal resulting from the conversion step corresponding to it: in other words, to use the coupling that enables the phase difference between the voltage and the current to be calculated.

This makes it unnecessary to reconstruct one of the digital signals resulting from the aforementioned conversion step. Thus the output digital signal of the control card used to calculate the phase difference is advantageously less noisy than a signal reconstructed by a converter. Another advantage is that the number of electronic components is reduced further, since a comparator used to process the digital signal of one of the physical quantities relating to the current or to the voltage can be eliminated.

In another embodiment, the method includes the following steps:
comparing:
  the number of incrementations of a first counter associated with said digital signal relating to a first physical quantity of the voltage type (Sgn_V1, PWM1-A) or of the current type (Sgn_I1, PWM1-B) during a period (P), and
  the number of incrementations of a second counter associated with said digital signal relating to a second physical quantity, different from said first physical quantity, of the current type (Sgn_I1, PWM1-B) or of the voltage type (Sgn_V1, PWM1-A), when said digital signal relating to the first physical quantity begins a new period (P),
said first and second counters being incremented regularly in time;
  calculating the difference in incrementation between the first and second counters;
  determining the phase difference between the first and second physical quantities as a function of the difference in incrementation between the first and second counters.

In one embodiment, provision is made to implement the locking by a proportional-integral controller in which the value of the proportional gain and the value of the integral gain are chosen so as to optimize the speed of convergence of the inverter frequency to the predetermined value.

In one embodiment, at least one step of filtering the absolute value of the phase difference is provided.

According to another of its objects, the invention concerns a computer program, including instructions for executing the method of contactless charging of a battery of a motor vehicle as mentioned above, when said program is executed by the motherboard.

According to another of its objects, the invention concerns a system of contactless charging, by magnetic induction, of a battery (Batt) of an electric motor vehicle, in which a resonant receiver circuit comprises a receiver coil, the system comprising:
  a resonant transmitter circuit comprising a transmitter coil,
  an inverter, to the terminals of which the transmitter coil is connected,
  an analog and digital motherboard on which a control card is located, at least one analog signal relating to a physical quantity of the current (I) or voltage (U) type at the terminals of the transmitter coil being measured so as to be digitally processed by means of said control card, at least two digital signals including a first digital signal (Sgn_V1, PWM1-A) relating to the voltage and a second digital signal (Sgn_I1, PWM1-B) relating to the current being injected into the input of the digital control card, which transmits from its output at least one digital signal (PWM1-A, PWM1-B) forming a switching instruction for the inverter, said control card digitally processing said at least two digital signals (Sgn_V1, Sgn_I1, PWM1-A, PWM1-B) injected into the input of the control card for calculating the phase difference between the current and the voltage,
the control card (42) being configured to lock the frequency of the switching instructions (PWM1-A, PWM1-B) sent to the inverter (3) to the value of the phase difference by means of digital processing, so that magnetic coupling can be provided between the transmitter coil (11) and the receiver coil (21) when the vehicle (30) is positioned above the transmitter coil (11).

In one embodiment of the aforementioned system, said first and second signals (Sgn_V1, Sgn_I1) injected into the input of the control card are output from said converter.

In one embodiment of the aforementioned system, said first signals (Sgn_V1, Sgn_I1) and second signals (PWM1-A, PWM1-B), injected into the input of the control card, are output from said converter and by said control card respectively.

BRIEF DESCRIPTION OF THE DRAWINGS

Other characteristics and advantages of the present invention will be more clearly apparent from a perusal of the following description, provided by way of an illustrative, non-limiting example, with reference to the attached figures, in which:

FIG. 4 shows an operating mode of the locking, FIGS. 5a and 5b show in a synchronous manner the way in which the phase difference can be calculated, FIG. 6 shows an embodiment of the method according to the invention, FIGS. 7a and 7b show in a synchronous manner, respectively, the variation of the resonance frequency and the variation of the phase difference signal (as a signed value, not an absolute value) as a function of time in the case of relative movement between the primary and the secondary.

DETAILED DESCRIPTION

Figure 1:
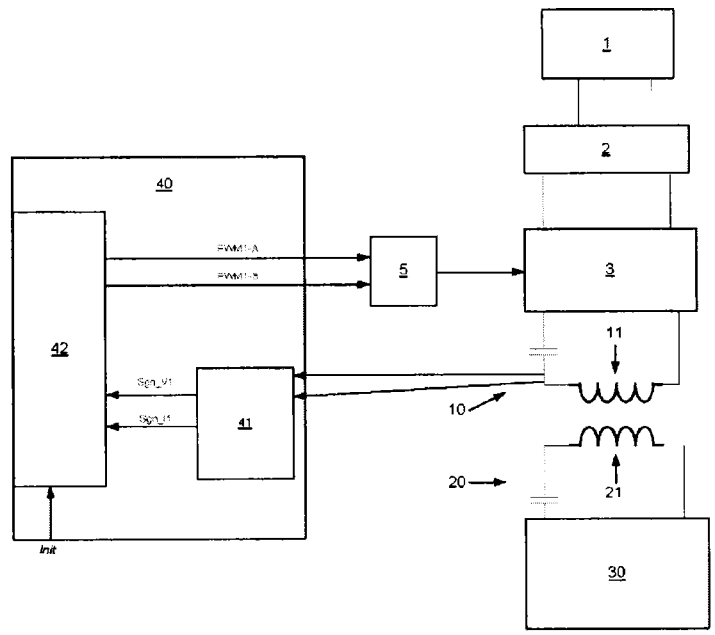
FIG. 1 shows a general schematic diagram of the contactless charging of a vehicle.
Figure 2:
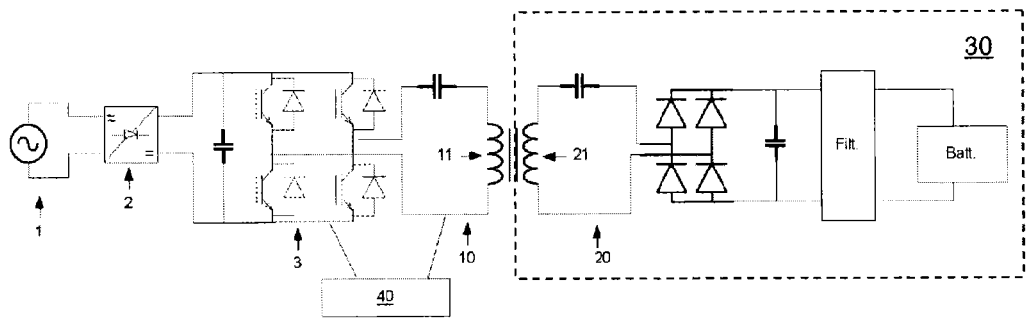
FIG. 2 shows some electronic details of the schematic diagram of FIG. 1.

FIG. 1 shows the general diagram of contactless charging of a vehicle, and FIG. 2 shows some electronic details of this general diagram.

A power source 1, typically a power network, emits a sinusoidal current toward a rectifier 2. The rectifier 2 can be used to supply an inverter 3 whose frequency is adjustable. The inverter 3 supplies a resonant charging circuit 10, called an LC circuit, comprising a charging coil 11, also called the transmitter coil or the primary.

The primary 11 is capable of charging the battery of a vehicle 30 having a resonant receiver circuit 20, comprising a receiver coil 21, also called the secondary coil or simply the "secondary".

The charging circuit 10 and the receiver circuit 20 are configured to resonate at the same resonance frequency.

This resonance frequency depends on the relative positions of the primary and the secondary.

In order to control the value of the resonance frequency, it is proposed that adjustments be made to the charging process only, rather than to the geographical position of the vehicle. For this purpose, adjustments are made to the inverter 3, whose frequency is controlled by a controller.

Figure 3:
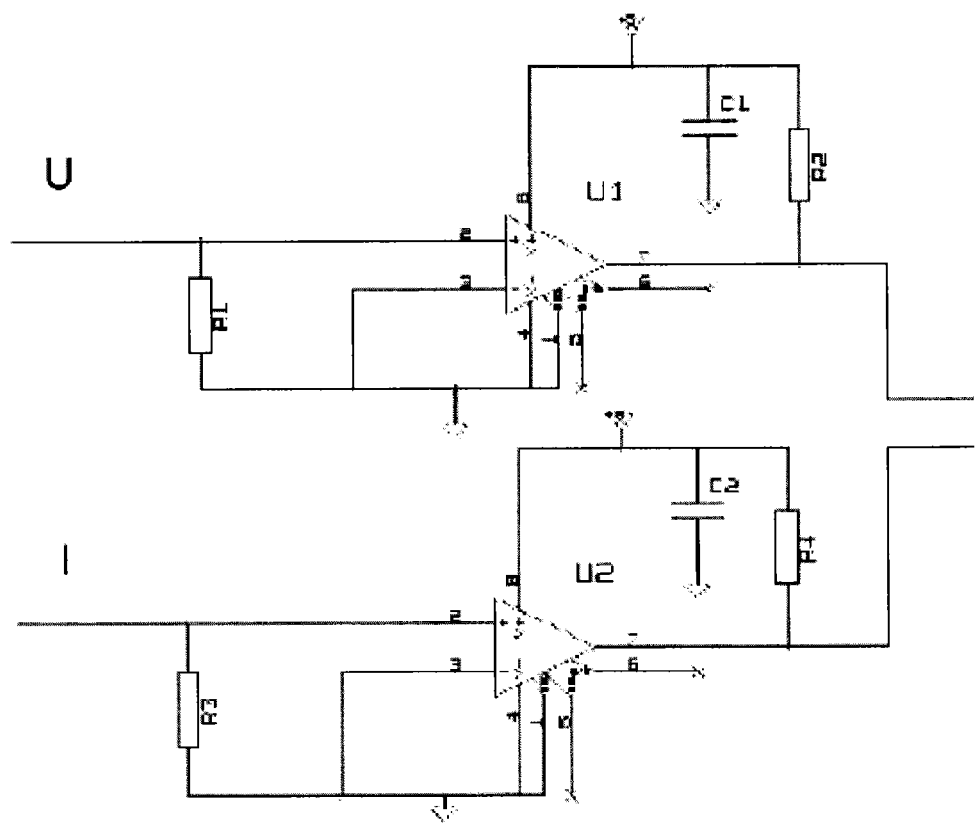
FIG. 3 shows an embodiment of a circuit for measuring the phase difference in absolute terms between the voltage and the current.

According to an embodiment shown in FIG. 3, the current U and the voltage I, in the form of analog signals at the terminals of the primary 11, are converted to digital signals, notably by means of comparators supplied with a voltage. By way of example, the comparators provided are supplied with a voltage in the range from 0 to 3.3 V.

By means of a converter 41, an analog signal relating to the current I is converted to a digital signal Sgn_I1 relating to the current I, and an analog signal relating to the voltage U is converted to a digital signal Sgn_V1 relating to a voltage. When processed in this way, the analog signals form digital signals Sgn_I1, Sgn_V1 compatible with a control card 42.

The digital signals Sgn_I1, Sgn_V1 output from the converter 41 are injected into the input of the digital control card 42, which outputs at least two digital signals, namely a first digital signal PWM1-A relating to the voltage U and a second digital signal PWM1-B relating to the current, said first and second signals forming the frequency instruction. The output signals PWM1-A and PWM1-B may be sent to a switch 5.

In this case, the switch 5 would be placed between the control card and the inverter for the purpose of choosing which of the two output signals PWM1-A and PWM1-B to use to lock the frequency instruction.

The converter 41 and the control card 42 are positioned on an analog and digital motherboard 40.

In a resonant circuit, the voltage and the current are in phase at resonance. In this case, the aim is to transfer power between the primary 11 and the secondary 21 at resonance.

FIG. 2 shows the different power stages in a more precise way, and FIG. 1 shows in detail, notably, the motherboard or block 40 corresponding to the control system.

FIG. 7b shows the frequency instruction NPWM sent by the control card to the inverter as a function of time.

To control the establishment of the frequency of the inverter 3, digital processing is provided, in order to supply the value of the phase difference denoted ph_num_red.

As shown in FIG. 6, at the analog level, the measurements 100 of the voltage U and the current I for converting 110 the analog signals relating to the voltage U and to the current I to digital signals Sgn_V1, Sgn_I1. For this purpose, a converter 41 as shown in FIG. 3 may be used.

In FIG. 3, U1 and U2 are comparators of the measurement of the voltage U (time slot signal) and the measurement of the current I (sinusoidal signal). At the outputs of these comparators, there are positive time slot signals which are offset from one another and form the digital signal Sgn_I1 for the current and the digital signal Sgn_V1 for the voltage.

The digital signals Sgn_I1, Sgn_V1 are sent toward the digital control card 42.

At the digital level, digital processing is used to calculate 120 the value of the phase difference between the voltage U and the current I, and to lock 130 the variable frequency of the inverter to the value of the phase difference. For this purpose, the control card 42 comprises a computer.

A (Boolean) initialization signal, init, is sent toward another input of the computer. The value of the initialization signal init indicates the command to perform or not to perform the power transfer. This makes it possible to command 140 the supply of electricity to the inverter 3, to the terminals of which the transmitter coil 11 is connected, at a variable frequency which is an image of the signal N_PWM defined below.

For this purpose, the computer comprises a controller, in this case a pulse width modulation (PWM) controller, whose output digital signal corresponds directly to the chopping period of the voltage inverter 3. The value of the signal N_PWM corresponds to a register value PWM and the chopping period T of the inverter 3 is linked to the value of the signal N_PWM by the relation:

$$T = N\_PWM / 10^8$$

This formula is linked to the clock cycles of the control card 2 (with a clock frequency of 100 MHz).

An embodiment of at least one part of the computer is shown in FIG. 4. It comprises three blocks, B1 to B3.

The blocks B1, B2 and B3 enable the frequency command for the inverter supply to be constructed on the basis of the digital signals Sgn_V1, Sgn_I1 output from the converter 41.

Block B1 corresponds to the software processing whose input data are incoming digital signals, formed, notably, by the digital signals relating to the voltage U and the current I, namely Sgn_V1 and Sgn_I1 respectively.

Block B2 is a filter which performs a filtering function, in this case that of a first-order low-pass filter. The control parameter (cut-off pulse) is fc_w, a typical value of which is, for example, 628 rad/s. The function of the block B1 is to eliminate the measurement noises produced by the digital signal ph_num_red. The value of the cut-off pulse fc_w is used, notably, to determine the speed at which the phase control will be provided.

Block B3 has the function of providing the phase locked loop control. By way of example, the controller used for block B3 is a controller of the proportional-integral type known to those skilled in the art.

In one embodiment, the digital processing performed by block B1 is intended to obtain a very precise measurement, at very high speed, of the phase between the two signals Sgn_V1 and Sgn_I1. The phases between these two signals may be negative or positive.

The signal Sgn_V1 is switched toward an interrupt input of the control card, denoted ecap3, while the signal Sgn_I1 is switched toward a second, capture, input of the control card, denoted ecap4. Each capture input has its own counter. Each counter is incremented by 1 by means of a clock of the control card, known to those skilled in the art. The clock period, denoted TCLK, defines one incrementation of the clock, and is equal to 10 nanoseconds, for example.

As shown in FIGS. 5a and 5b, to be viewed synchronously, hardware interrupts are defined in such a way that, on a rising front of the capture input ecap3, the counter for the capture input ecap3 causes a reset, while on a rising front of the capture input ecap4, the counter for the capture input ecap4 causes a reset of the counter associated with ecap4.

By way of example, as shown in FIG. 5b, a software interrupt is executed on the input ecap3. At the instant of the software interrupt, the counter associated with ecap3 counts a number N of images of the period of the signal Sgn_V1. This value is stored by the control card and the counter is reset. Thus the measured period of the signal is T=N*TCLK.

At the instant when the counter associated with the capture input ecap3 is reset, the value of the counter associated with the input ecap4 is stored. When the signal Sgn_I1 has a phase lead over Sgn_V1, the value read on the counter is Diff. The value Diff is a direct image of this delay, and the phase measured in degrees is then equal to 360*Diff/N. If the signal Sgn_I1 has a phase lag relative to Sgn_V1, the value read on the counter is N−Diff, and the phase measured in degrees is 360*(Diff−N)/N.

When the numbers N and Diff have been found, it is possible to distinguish whether the phase is positive or negative as a function of the comparison between the numbers Diff and N/2:
  If Diff<N/2, then the measured phase is equal to 360*Diff/N and is in the range from 0 to 180 degrees.
  If Diff>N/2, then the measured phase is equal to 360*(Diff−N)/N and is in the range from −180 to 0 degrees.

In an exemplary embodiment which enables the phase to be determined on the basis of the values of the counters N and Diff, if the counter diff is greater than half of the period N, the phase returned is 360*Diff/N. If the counter diff is greater than half of the period N, the phase returned is 360*(Diff/N−1).

In one embodiment, the locking principle is that of starting from an initial low frequency, determined by the initial value, corresponding for example to a typical initial value T_init of 9000. This value is time-homogeneous; to find the amount in seconds, it is divided by 10^8, with a clock frequency of 100 MHz.

This initial value T_init is parameterizable.

Thus, if the initial value is 9000, the initial frequency of the inverter 3 is then:

Frequency=10^8/9000=11,111 Hz.

If the controller is activated, the frequency command of the inverter 3 is determined by the value of the signal N_PWM according to the relation:

N_PWM=T_init−U_Corr where U_Corr is the output of the P-I controller (negative at the outset).

Thus the value of the signal N_PWM will progressively decrease and the frequency of the power supply will progressively increase up to the desired resonance value.

The adjustment parameters of the P-I corrector (not shown in the figures) are:
  the proportional gain Kp,
  the integral gain Ki.

These two parameters can be used to adjust the speed of convergence of the variable frequency to resonance.

The first input of block B3 is a phase difference instruction value INST_PH that is to be achieved. By way of example, the typical value of the phase difference instruction INST_PH is 0°. Since the digital signal ph_num_red is constructed digitally, it is advantageously possible to parameterize a zero instruction, which is an advantage compared with analog processing of the phase difference measurement between the voltage U and the current I, while the various imperfections of an analog processing system are avoided by this means.

The second input is the quantity to be controlled, namely the measured phase ph_num_red, which can be filtered by means of block 2.

The third input is the signal init (a Boolean signal indicating an initialization state); when the signal is equal to 1, it signifies a waiting state, for which no attempt is made to transfer power, and that the output of the PI controller is equal to the value determined by the fourth input, which is therefore a zero value in this case.

When the signal init is equal to 0, the output of the PI controller will progressively decrease (because the initial value is of the order of −90°); the corrector will thus reduce N_PWM progressively, starting from the value determined by T_init, until the desired value (the value close to resonance) is reached.

The fourth input is an initial value INITIAL_VAL, set at 0 in this case. No instruction is sent until the charging command has been given, that is to say until the signal "init" has changed to 0.

FIGS. 7a and 7b show respectively, in a synchronous manner, the frequency instruction NPWM sent by the control card to the inverter as a function of time and the variation of the phase difference signal ph_num_red as a function of time, during a test.

FIG. 7a shows three curves, namely a first curve relating to the frequency instruction NPWM, a second curve relating to a signal denoted Mode, indicating whether the invention is in open loop mode (where the frequency is fixed) or closed loop mode (where the frequency varies to provide the desired phase), and a third curve relating to a signal denoted Activation, defining the signal of a button by means of which the start of power transfer for the battery charging is initiated manually.

As can be seen in FIG. 7a, before t=10.8 s Activation is equal to 0, and at about t=10.8 s it is equal to 1.

Thus, before t=10.8 s, the signal NPWM is constant, while after t=10.8 s the signal NPWM decreases progressively to the desired resonance value.

FIG. 7b shows three curves, namely a fourth curve denoted Instruction relating to the phase instruction, a fifth curve relating to the measured phase ph_num_red, and a sixth curve relating to the phase ph_num_red filtered by block 2, denoted filtered phase.

By way of example, as can be seen in FIG. 1, when the signal Activation is equal to 0 there is no chopping by the inverter, and therefore the phase is not measured. As soon as the signal Activation is equal to 1, the proportional-integral controller is initialized to a zero correction. As seen in FIG. 7a, the maximum frequency instruction has been set in this test to NPWMmax=6,000, corresponding to a frequency f=16,670 Hz.

As can be seen in FIG. 7b, the noise on the measurement is very low and the various signals are rapidly stabilized. Additionally, the filtered phase makes it possible to be free of any measurement noise.

It should be noted that the locking has been set to be less dynamic in this case, but the speed of the locking can be increased significantly.

Figure 8:
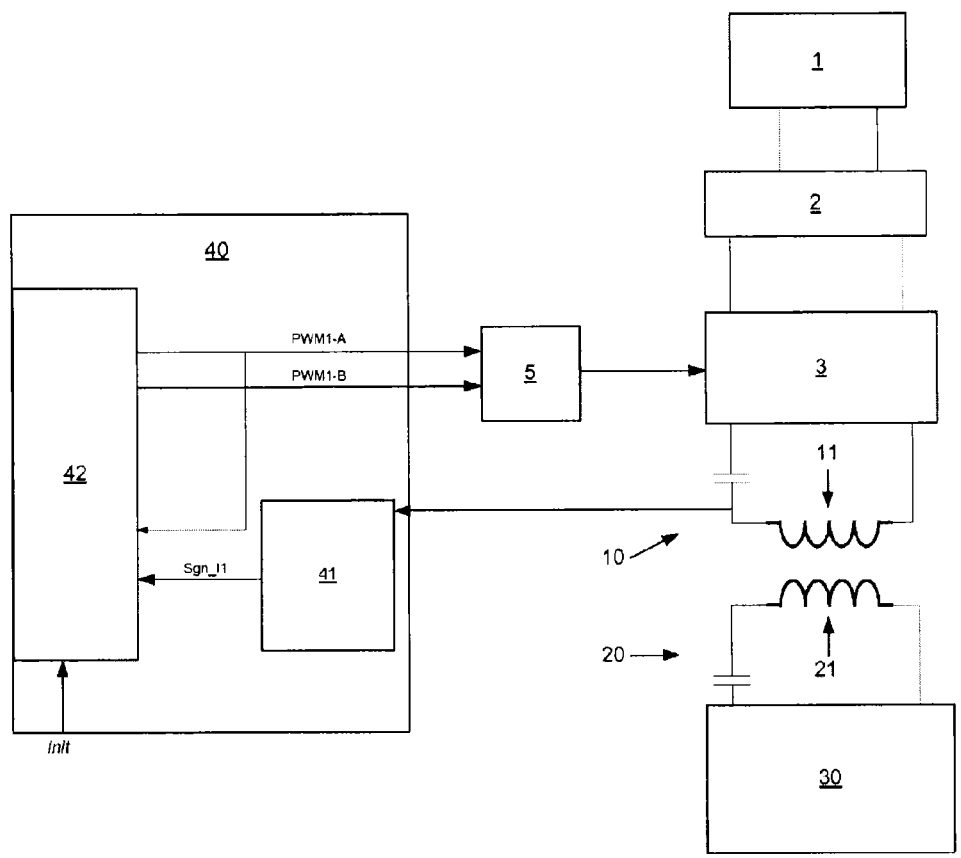
FIG. 8 shows a general schematic diagram of contactless charging of a vehicle, representing an alternative to the solution shown in FIG. 1.

FIG. 8 shows the whole of the contactless charging system and the simplicity of control achieved as a result of the digital measurement of the signals sent from the charging circuit 10. The signal sent from the charging circuit 10 is analog information providing an image of a current or a voltage in the resonant circuit of the transmitter coil. This signal may, for example, be the current in the coil or the voltage at the terminals of the capacitor. The control unit 40 is simplified by the fact that digital processing is performed on the basis of the signals Sgn_I1 and (Sgn_V1, PWM1-A).

The invention claimed is:

1. A method of contactless charging of a battery of an electric motor vehicle by magnetic induction between a resonant transmitter circuit including a transmitter coil of a charging device for contactless charging the battery of the electric motor vehicle and a resonant receiver circuit of the electric motor vehicle including a receiver coil, the electric motor vehicle being positioned above the transmitter coil of the charging device for contactless charging the battery of the electric motor vehicle to provide magnetic coupling between the transmitter coil of the charging device for contactless charging the battery of the electric motor vehicle and the receiver coil of the resonant receiver circuit of the electric motor vehicle, the method comprising:
   a) controlling electrical power supply and instructions of an inverter to terminals of which the transmitter coil of the charging device for contactless charging the battery of the electric motor vehicle is connected according to a variable frequency;
   b) measuring in an analog circuit at least one analog signal relating to a current or to a voltage across terminals of the transmitter coil of the charging device for contactless charging the battery of the electric motor vehicle;
   c) digitally processing, using a control card, at least two incoming signals, of a first incoming digital signal relating to the voltage and a second incoming digital signal relating to the current, to calculate a phase difference between the current and the voltage; and
   d) transmitting digital output signals from the control card to the inverter to lock the inverter to the calculated value of the phase difference between the current and the voltage.

2. The method as claimed in claim 1, further comprising: converting the at least one analog signal to at least one digital signal.

3. The method as claimed in claim 2, wherein:
during c), the at least two incoming digital signals are formed by a digital signal relating to the voltage and a digital signal relating to the current, these two signals resulting from the converting.

4. The method as claimed in claim 2, wherein,
during c), the at least two incoming digital signals are formed, according to choice, by:
a digital signal relating to the current and resulting from the converting, and an output digital signal relating to the voltage, or
a digital signal relating to the voltage and resulting from the converting, and an output digital signal relating to the current.

5. The method as claimed in claim 1, further comprising: comparing:
a number of incrementations of a first counter associated with the digital signal relating to a first physical quantity of voltage type or of current type during a period; and
a number of incrementations of a second counter associated with the digital signal relating to a second physical quantity, different from the first physical quantity, of the current type or of the voltage type, when the digital signal relating to the first physical quantity begins a new period;

the first and second counters being incremented regularly in time;
calculating a difference in incrementation between the first and second counters;
determining a phase difference between the first and second physical quantities as a function of the difference in incrementation between the first and second counters.

6. The method as claimed in claim 1, wherein the locking by the digital processing is implemented by a proportional-integral controller in which a value of the proportional gain and a value of the integral gain are chosen to optimize a speed of convergence of a frequency of the inverter to the predetermined value.

7. The method as claimed in claim 1, further comprising at least filtering the value of the phase difference.

8. A non-transitory computer-readable storage medium storing computer-readable instructions that, when executed by a computer, cause the computer to perform a method of contactless charging of a battery of an electric motor vehicle by magnetic induction between a resonant transmitter circuit including a transmitter coil of a charging device and a resonant receiver circuit of the vehicle including a receiver coil, the electric motor vehicle being positioned above the transmitter coil to provide magnetic coupling between the transmitter coil and the receiver coil, the method comprising:
   a) controlling electrical power supply and instructions of an inverter to terminals of which the transmitter coil is connected according to a variable frequency;
   b) measuring in an analog circuit at least one analog signal relating to a current or to a voltage across terminals of the transmitter coil,
   c) digitally processing, using a control card, at least two incoming signals, of a first incoming digital signal relating to the voltage and a second incoming digital signal relating to the current, to calculate a phase difference between the current and the voltage; and
   d) transmitting digital output signals from the control card to the inverter to lock the inverter to the calculated value of the phase difference between the current and the voltage.

9. A system of contactless charging, by magnetic induction, of a battery of an electric motor vehicle, in which a resonant receiver circuit includes a receiver coil, the system comprising:
a resonant transmitter circuit comprising a transmitter coil;
an inverter, to terminals of which the transmitter coil is connected; and
an analog and digital motherboard on which a control card is located, at least one analog signal relating to a physical quantity of a current or voltage at terminals of the transmitter coil being measured to be digitally processed by the control card, at least two digital signals including a first digital signal relating to a voltage and a second digital signal relating to a current being injected into an input of the control card, which transmits from its output at least one digital signal forming a switching instruction for the inverter, the control card digitally processing the at least two digital signals injected into the input of the control card for calculating a phase difference between the current and the voltage;
the control card being configured to lock a frequency of the switching instructions sent to the inverter to a value of the phase difference by digital processing, so that magnetic coupling can be provided between the transmitter coil and the receiver coil when the vehicle is positioned above the transmitter coil.

10. The system as claimed in claim 9, wherein a converter is provided on the analog motherboard and is configured to convert at least one analog signal to at least one digital signal.

11. The system as claimed in claim 10, wherein the first and second signals injected into the input of the control card are output from the converter.

12. The system as claimed in claim 9, wherein the first signals and second signals, injected into the input of the control card, are output from the converter and from the control card respectively.

* * * * *